US005499835A

United States Patent [19]
Skirchak, Jr. et al.

[11] Patent Number: 5,499,835
[45] Date of Patent: Mar. 19, 1996

[54] MOTORCYCLE STROLLER

[76] Inventors: Samuel Skirchak, Jr.; Jacqueline A. Skirchak, both of 43 Fieldstone Ter., Naugatuck, Conn. 06770

[21] Appl. No.: 493,642

[22] Filed: Jun. 22, 1995

[51] Int. Cl.⁶ ............................... B62H 7/00; B62K 9/02
[52] U.S. Cl. ...................... 280/293; 280/47.371; 280/62; 280/282; 280/288.4
[58] Field of Search ................................. 280/293, 282, 280/62, 47.371, 288.4

[56] References Cited

U.S. PATENT DOCUMENTS

| 5,028,066 | 7/1991 | Garth | 280/282 |
| 5,217,240 | 6/1993 | Gardenhour, Jr., et al. | 280/282 |
| 5,306,030 | 4/1994 | Becka | 280/282 |

*Primary Examiner*—Mitchell J. Hill

[57] ABSTRACT

A motorcycle stroller including a trike frame. The trike frame has a front end, a rear end and a base with brackets on a lower area thereof. The front end has a housing attached and seated on a front section of the base. The housing has seated thereon a casing. The casing has a front portion with a throat with a front fork, an upper surface and a cavity therein. Included is a handlebar that is attached to the throat at a side opposite the front fork. The rear end of the frame has positioned thereon a storage unit. The storage unit has a bottom wall integral a rear section of the base of the frame, a rear wall, a front wall with a horizontal projection in a plane above the bottom wall and a pair of opposed side walls and an opening along an upper edge. The side walls each have a side opening. Included is a lid that has a rear edge hingeablly coupled to the horizontal projection. A front wheel and two rear wheels to support the frame. A seat positioned on the base. Lastly, a handle for pushing a stroller formed by the frame positioned in the side openings of the side wall of the storage unit.

12 Claims, 3 Drawing Sheets

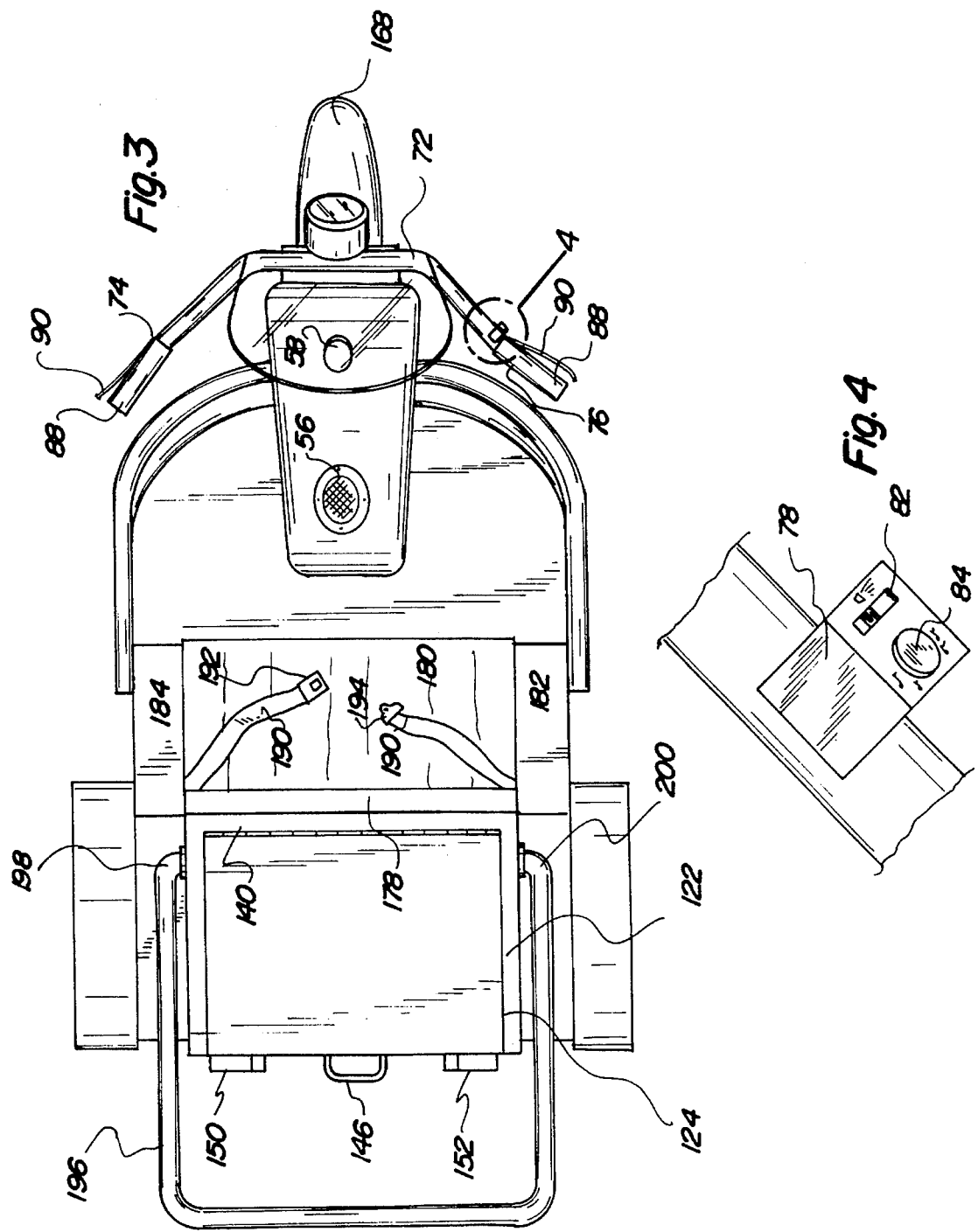

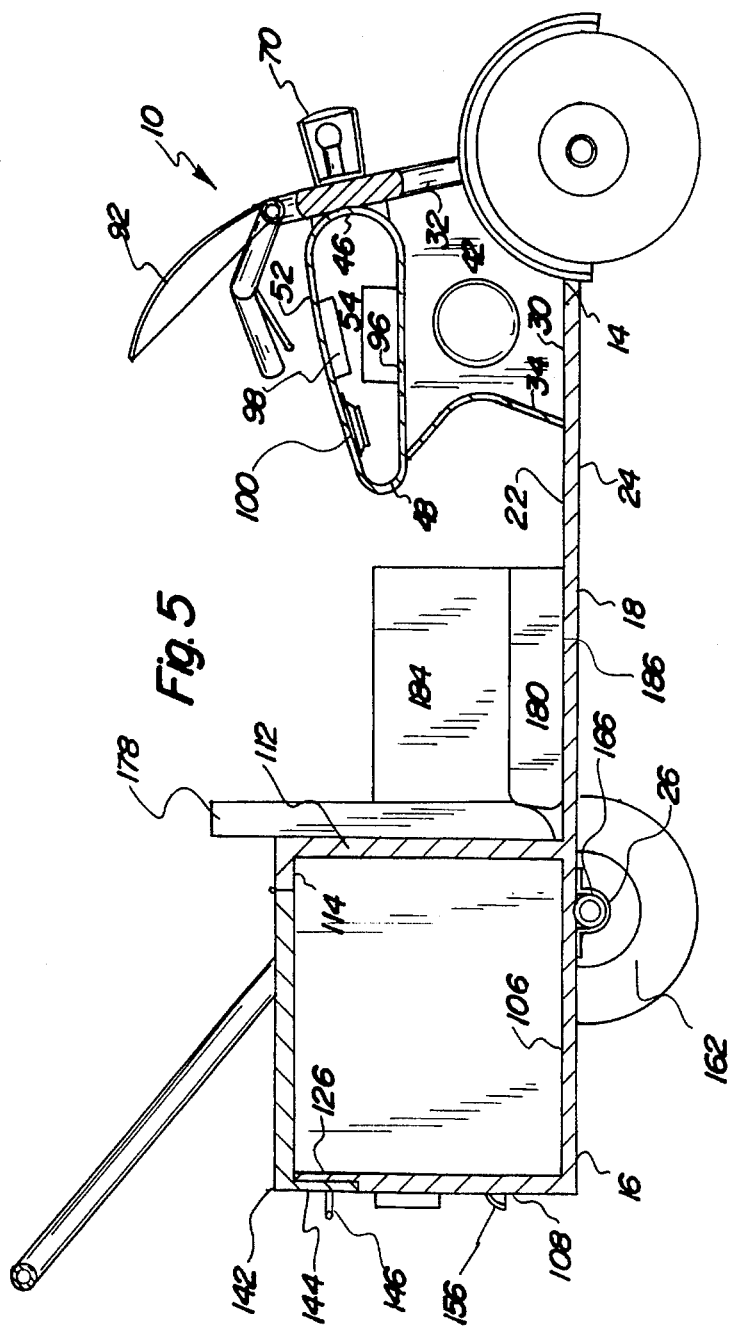
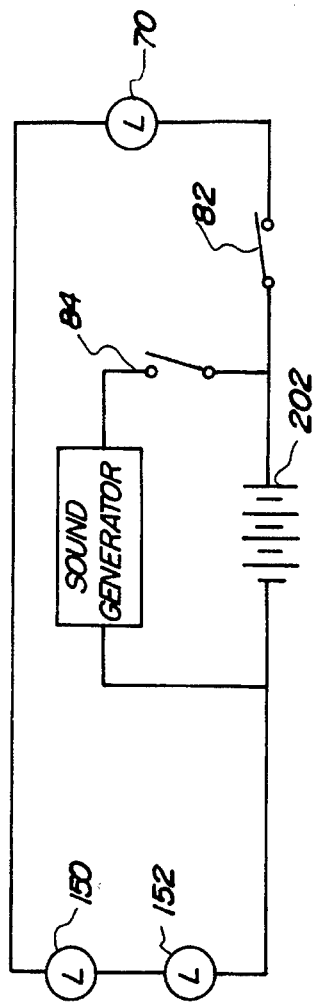

5,499,835

MOTORCYCLE STROLLER

BACKGROUND OF THE INVENTION

1. Field of the Invention

The present invention relates to a motorcycle stroller and more particularly pertains to allowing an infant or small child to be transported with a walking adult in a trike framed stroller when the infant is placed in the seat of the trike and further allowing the ready transport of the infant or small child on all types of receiving surfaces when the frame is supported by wide wheels.

2. Description of the Prior Art

The use of strollers is known in the prior art. More specifically, strollers heretofore devised and utilized for the purpose of carrying an infant while walking are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,029,891 to Jacobs discloses an infant stroller. U.S. Pat. No. 4,953,880 to Sudkoff discloses a jogging stroller. U.S. Pat. Des. No. 287,478 to Miles discloses a stroller. U.S. Pat. No. 4,365,819 to Bart discloses a merry-go-round stroller. U.S. Pat. Des. No. 325,364. Lastly, U.S. Pat. Des. No. 247,618 to Sparkes discloses a stroller.

While these devices fulfill their respective, particular objectives and requirements, the aforementioned patents do not describe a motorcycle stroller that has wide wheels that allow an infant or child to be transported through sand or gravel with ease and has lights to ensure visibility of the motorcycle stroller when used at night or in the day.

In this respect, the motorcycle stroller according to the present invention substantially departs from the conventional concepts and designs of the prior art, and in doing so provides an apparatus primarily developed for the purpose of allowing an infant or small child to be transported with a walking adult in a trike framed stroller when the infant is placed in the seat of the trike and further allowing the ready transport of the infant or small child on all types of receiving surfaces when the frame is supported by wide wheels.

Therefore, it can be appreciated that there exists a continuing need for a new and improved motorcycle stroller which can be used for allowing an infant or small child to be transported with a walking adult in a trike framed stroller when the infant is placed in the seat of the trike and further allowing the ready transport of the infant or small child on all types of receiving surfaces when the frame is supported by wide wheels. In this regard, the present invention substantially fulfills this need.

SUMMARY OF THE INVENTION

In view of the foregoing disadvantages inherent in the known types of strollers now present in the prior art, the present invention provides an improved motorcycle stroller. As such, the general purpose of the present invention, which will be described subsequently in greater detail, is to provide a new and improved motorcycle stroller and method which has all the advantages of the prior art and none of the disadvantages.

To attain this, the present invention essentially comprises in combination a trike frame. The trike frame has a front end, a rear end and a base therebetween. The base has an upper area and a lower area with a pair of spaced apart brackets spaced from the rear end. The front end has a generally rectangular housing attached thereto and seated on a front section of the upper area of the base. The housing has a front panel and a rear panel. The housing has seated thereon a generally pear-shaped casing forming an interior area within the front and rear panel of the housing. The casing has a front portion and a rear portion integral the rear panel of the housing. The casing further has an upper surface and a cavity therein. The front portion of the casing has attached thereto a throat with a front fork being integral and extending downwardly therefrom. The upper surface has spaced apart a pair of openings. Included is a handlebar that is attached to the throat at a side opposite the front fork. The handlebar has a left handle and a right handle with a throttle spaced from the right handle end. The throttle has a light switch and a sound switch. Each handle has a handle cover with a break lever attachment integral the cover. The handlebar further have a windshield extending upward therefrom Also included is a mini-computer positioned within the cavity of the casing. A battery casing is included within the cavity and positioned along the upper surface of the casing. The battery casing has an entrance integral one of the openings of the upper surface of the casing. Included in the cavity is a speaker. The speaker is positionable within the cavity along the upper surface of the casing. The speaker has sound exiting another of the openings of the upper surface of the casing. The rear end of the frame has positioned thereon a box-like storage unit. The storage unit has a bottom wall integral a rear section of the upper area of the base of the frame, a rear wall, a front wall with a short horizontal projection in a plane above the bottom wall and a pair of opposed side walls. The front wall, the rear wall and the pair of opposed side walls of the storage unit have an upper edge. The upper edge forms a generally rectangular opening in a plane parallel the bottom wall. The rear wall has a recessed top portion. The side walls each have a side opening spaced from the front and adjacent the upper edge. A generally rectangular lid is included. The lid has a rear edge and a front edge with a flap extending therefrom. The flap has a handle centrally positioned thereon. The rear edge of the lid is hingeablly coupled to the horizontal projection of the front wall of the storage unit. The lid is capable of being positioned over the rectangular opening of the storage unit to form a flush upper surface. A pair of tail lights is included. The tail lights are positioned on the rear wall of the storage unit. Each tail light projecting exterior the rear wall and spaced apart. Additionally, three wide wheels forming a front wheel and two rear wheels are included. The front wheel is positionable between the front fork of the frame. The two rear wheels have an axial therebetween. The axial has a length for positioning through the spaced apart brackets of the frame. The three wide wheels support the frame above a recipient surface. A seat is provided. The seat has a back, a lower cushion and a pair of side arm rest. The seat is positionable on the base of the frame. The back leans against the front wall of the storage unit. The lower cushion rest on the upper area of the base adjacent the rear section of the base. Each side arm rest has a bottom panel attached to the base and an interior side next to the lower cushion and the back. The seat has seat belts for securing an infant therein. Lastly, a rigid U-shaped handle with a pair of in turned ends is provided. Each end is capable of being positioned within one of the side openings of the side wall of the storage unit. The handle is capable of having an exterior force exert a forward motion thereon to move a stroller formed by the frame.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorcycle stroller which has all of the advantages of the prior art strollers and none of the disadvantages.

It is another object of the present invention to provide a new and improved motorcycle stroller which may be easily and efficiently manufactured and marketed.

It is further object of the present invention to provide a new and improved motorcycle stroller which is of durable and reliable constructions.

An even further object of the present invention is to provide a new and improved motorcycle stroller which is susceptible of a low cost of manufacture with regard to both materials and labor, and which accordingly is then susceptible of low prices of sale to the consuming public, thereby making such motorcycle stroller economically available to the buying public.

Still yet another object of the present invention is to provide a new and improved motorcycle stroller which provides in the apparatuses and methods of the prior art some of the advantages thereof, while simultaneously overcoming some of the disadvantages normally associated therewith.

Even still another object of the present invention is to provide a motorcycle stroller for allowing an infant or small child to be transported with a walking adult in a trike framed stroller when the infant is placed in the seat of the trike and further allowing the ready transport of the infant or small child on all types of receiving surfaces when the frame is supported by wide wheels.

Lastly, it is an object of the present invention to provide a new and improved motorcycle stroller including a trike frame. The trike frame has a front end, a rear end and a base therebetween, the base having a lower area with a pair of spaced apart brackets spaced from the rear end. The front end has a housing attached thereto and seated on a front section of the base. The housing has a front panel and seated thereon a casing. The casing has a front portion, an upper surface and a cavity therein. The front portion of the casing has attached thereto a throat with a front fork extending downwardly therefrom. A handlebar is attached to the throat at a side opposite the front fork. The handlebar has a left handle and a right handle with each handle having a cover. The rear end of the frame has positioned thereon a storage unit. The storage unit has a bottom wall integral a rear section of the base of the frame, a rear wall, a front wall with a short horizontal projection in a plane above the bottom wall and a pair of opposed side walls and an opening along an upper edge. The side walls each have a side opening spaced from the front and adjacent the upper edge. A lid with a rear edge and a front edge. The rear edge of the lid is hingeablly coupled to the horizontal projection of the front wall of the storage unit. The lid is positioned over the opening of the storage unit to form a flush upper surface. Three wide wheels form a front wheel and two rear wheels. The front wheel is positioned between the front fork of the frame. The two rear wheels have an axial therebetween for positioning through the spaced apart brackets of the frame. A seat has a back, a lower cushion and a pair of side arm rest. The seat is positioned on the base of the frame. The seat has seat belts for securing an infant therein. A rigid U-shaped handle for pushing a stroller formed by the frame and has a pair of ends capable of being positioned within one of the side openings of the side wall of the storage unit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is top plan view of the preferred embodiment of the present invention of FIG. 1.

FIG. 4 is a sectional view of the handle shown an enlarged view of the throttle of the present invention.

FIG. 5 is a side view of the present invention in an operable configuration.

FIG. 6 is an electrical schematic of the flow of current in the present invention of FIG. 1.

The same reference numerals refer to the same parts through the various Figures.

DESCRIPTION OF THE PREFERRED EMBODIMENT

Figure 1:
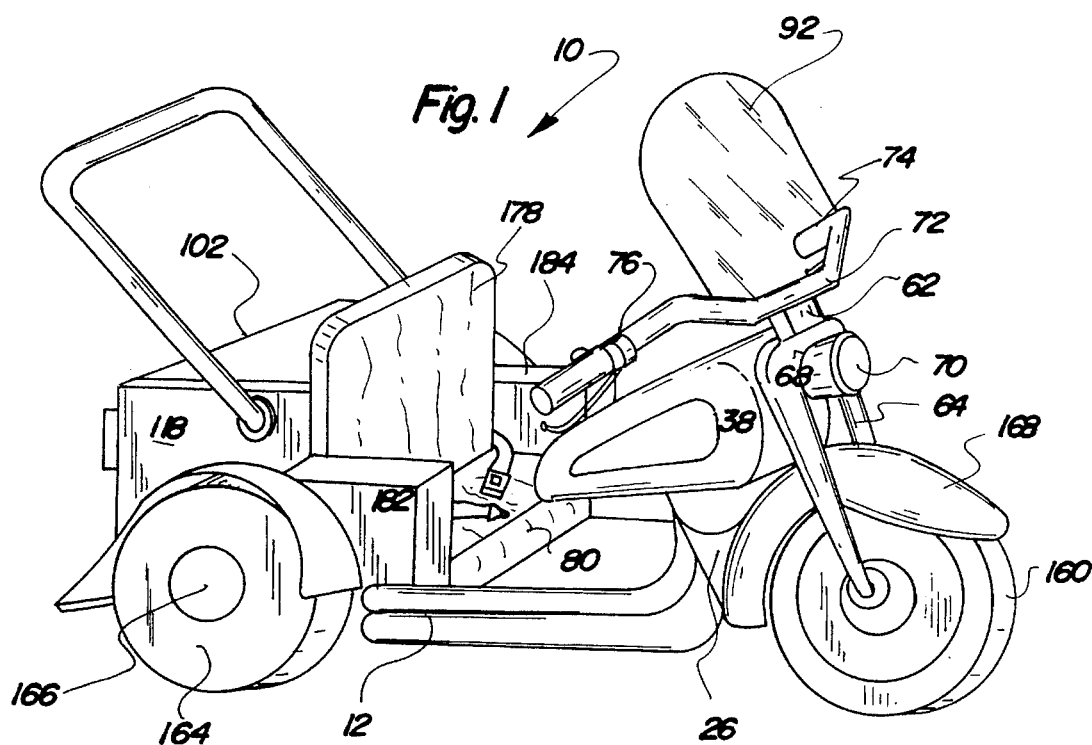
FIG. 1 is a perspective view of the preferred embodiment of the motorcycle stroller constructed in accordance with the principles of the present invention.

With reference now to the drawings, and in particular to FIG. 1 thereof, the preferred embodiment of the new and improved motorcycle stroller embodying the principles and concepts of the present invention and generally designated by the reference numeral 10 will be described.

The present invention, the motorcycle stroller 10 is comprised of a plurality of components. Such components in their broadest context include a frame, handlebars, a seat, a storage unit and wheels. Such components are individually configured and correlated with respect to each other so as to attain the desired objective.

Specifically, the present invention includes a trike frame 12. The trike frame has a front end 14, a rear end 16 and a base 18 therebetween as shown in FIG. 5. The trike frame is made of high density plastic. The base has an upper area 22 and a lower area 24 with a pair of spaced apart brackets 26 spaced from the rear end 16. The front end has a generally rectangular housing 26 attached thereto and seated on a front section 30 of the upper area 22 of the base, as shown in FIG. 1. The housing has a front panel 32 and a rear panel 34. As illustrated in FIG. 1, the housing has seated thereon a generally pear-shaped casing 38. The casing forms an interior area 42 within the front and rear panel of the housing. The casing is formed of plastic and is in the likeness of a motorcycle fuel tank. The casing has a front portion 46 and a rear portion 48 integral the rear panel of the housing. The casing further has an upper surface 52 and a cavity 54 therein, as depicted in FIG. 5. The upper surface has a pair of spaced apart openings 56 and 58 thereon.

The front portion of the casing has attached thereto a throat 62 with a front fork 64 that is integral and extending downwardly therefrom. The front fork has an arc 68 with a front light 70 attached thereto. The front light, as shown in FIG. 1, is positioned opposite the casing 38.

As best illustrated in FIG. 3, a handlebar 72 is provided. The handlebar is attached to the throat 62 at a side opposite the front fork 64. The handlebar is formed of plastic. The handlebar has a left handle 74 and a right handle 76 with a throttle 78, as shown in FIG. 4, spaced from the right handle end. The throttle has a light switch 82 and a sound switch 84. Each handle has a handle cover 88 with a break lever attachment 90 integral the cover. The brake lever attachment, as shown in FIG. 3 is non operational. The handlebar further has a windshield 92 extending upward therefrom.

The cavity of the casing, as shown in FIG. 5, has included within a mini-computer 96, a battery casing 98 and a speaker 100. The mini-computer is positioned in a portion of the cavity 54 nearest the housing 26. The battery casing is positioned along the upper surface 52 of the casing 38 and spaced from the front portion 46. The battery casing has an entrance that is integral one of the openings 58 of the upper surface of the casing, as shown in FIG. 3. The speaker is positioned along the upper surface of the casing 38 and spaced from the rear portion 48. The speaker can emit sound from another of the openings 56 of the upper surface of the casing.

Furthermore, the rear end of the frame has positioned thereon a box-like storage unit 102. The storage unit is formed of plastic and sized to carry packages. The storage unit, as illustrated in FIG. 5, has a bottom wall 106 integral a rear section of the upper area of the base 18 of the frame 12, a rear wall 108, a front wall 112 with a short horizontal projection 114 in a plane above the bottom wall 106 and a pair of opposed side walls 116 and 118. The front wall, the rear wall and the pair of opposed side walls of the storage unit having an upper edge 122 that forms a generally rectangular opening 124 in a plane parallel the bottom wall. The rear wall has a recessed top portion 126. The side walls each have a side opening 132 and 134 spaced from the front wall 112 and adjacent the upper edge 122.

A generally rectangular lid 138, as shown in FIG. 3, is included. The lid a rear edge 140 and a front edge 142 with a flap 144 extending therefrom. The flap has a handle 146 centrally positioned thereon. The rear edge of the lid being hingeablly coupled to the horizontal projection of the front wall of the storage unit. The lid is capable of being positioned over the rectangular opening 124 of the storage unit 102 to form a flush upper surface. The lid may be opened and closed by using the handle. The hinge, as shown in FIG. 5, allows the lid to remain in communication with the storage unit.

Figure 2:
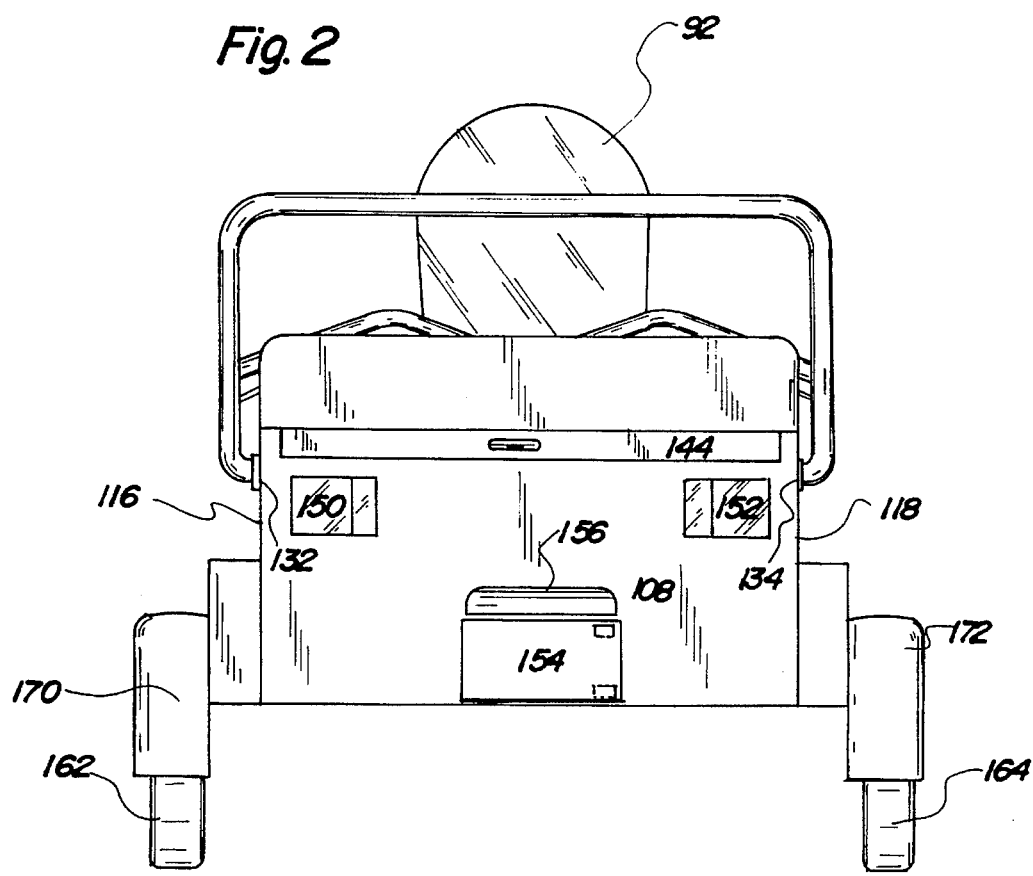
FIG. 2 is a rear view of the preferred embodiment of the motorcycle stroller in accordance with the principles of the present invention.

As best illustrated in FIG. 2, the rear wall 108 has a pair of tail lights 150 and 152, a license plate 154 and a plate light 156. The pair of tail lights are located a distance above the base and project exterior the rear wall. The pair of tail lights are spaced apart along a common horizontal axis. The license plate is centrally positioned and adjacent the rear end of the frame. The license plate may be formed of plastic or metal and for placing information thereon. The plate light is positioned above the license plate to illuminate the license plate.

Supporting the frame are three wide wheels. The wheels form a front wheel 160 and two rear wheels 162 and 164. The wheels are formed of a rubberized material. The front wheel is positionable between the front fork 64 of the frame 12. The two rear wheels have an axial 166 therebetween. The axial has a length for positioning through the spaced apart brackets 26 of the frame. The three wide wheels support the frame above a recipient surface. The width of the wheels allow the motorcycle stroller to maneuver through gravel and sand with ease. The front and the rear wheels have fenders positioned over them, as shown in FIG. 3. The front fender 168 and the rear fenders, 170 and 172 are attached to the frame. The front fender is attached to the front panel 32 of the housing 42 of the frame. The rear fender is attached to lower area 24 of the base 18. The fenders prevent sand and other loose material, on the recipient surface, from being thrown on the infant in the stroller.

Additionally, a seat is included. The seat has a back 178, a lower cushion 180 and a pair of side arm rest 182 and 184. The seat is formed of a breathable foam covered in fabric, plastic or leather. The seat is positionable on the base 18 of the frame. The back leans against the front wall 112 of the storage unit. The lower cushion rests on the upper area 22 of the base adjacent the rear section of the base. Each side arm rest has a bottom panel 186 attached to the base and an interior side next to the lower cushion and the back. The seat has seat belts 190 for securing an infant therein. The seat belts are coupled together with a buckle 192 and clamp 194.

Lastly, as illustrated in FIG. 2, a rigid U-shaped handle 196 is included. The U-shaped handle has a pair of in turned ends 198 and 200. Each end is capable of being positioned within one of the side openings of the side walls of the storage unit. The handle is capable of receiving an exterior force exerting a forward motion thereon. Forward motion as applied to the handle moves a stroller formed by the frame.

With regards to FIG. 6, the schematic depicts the electric circuit for the operation of the lights and sound. The power source for the circuit is a battery 202. Pressing the sound switch allows current to pass from the power source to a sound generator. Once the sound generator receives current it emits an audible sound like that of a motorcycle engine from the speaker in the cavity. Activating the light switch allows delivery of battery power form the battery to the light circuit for operation of the front and tail lights.

The present invention is a motorcycle stroller that has a trike frame supported by a front wheel and two rear wheels. The frame is made of high density plastic and the wheels are made of rubber. The frame has a seat, handlebars, front forks and a storage unit. The seat is structured to carry an infant or small child while the motorcycle stroller is pushed. The motorcycle stroller is durable and has wide tires for use on grass, gravel, sand, snow and pavement. Another feature of the motorcycle stroller is the lights. The stroller has front and rear lights. The lights increase the visibility of the stroller and the user as all times. The lights are highly important when the stroller is being used at night. Additional safety features of the stroller are the seat belts, the windshield and the arm rest. The feature keep the infant or small child secure and safe when being pushed in the motorcycle stroller.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved motorcycle stroller for transportation of an infant while walking comprising, in combination:

a trike frame having a front end, a rear end and a base therebetween, the base having an upper area and a lower area with a pair of spaced apart brackets spaced from the rear end, the front end having a generally rectangular housing attached thereto and seated on a front section of the upper area of the base, the housing having a front panel and a rear panel, the housing having seated thereon a generally pear-shaped casing forming an interior area within the front and rear panel of the housing, the casing having a front portion and a rear portion integral the rear panel of the housing, the casing further having an upper surface and a cavity therein, the front portion of the casing having attached thereto a throat with a front fork being integral and extending downwardly therefrom, the upper surface having a spaced apart openings;

a handlebar being attached to the throat at a side opposite the front fork, the handlebar having a left handle and a right handle with a throttle spaced from the right handle end, the throttle having a light switch and a sound switch, each handle having a handle cover with a break lever attachment integral the cover, the handlebar further having a windshield extending upward therefrom;

a mini-computer positioned within the cavity of the casing;

a battery casing within the cavity positioned along the upper surface of the casing, the battery casing having an entrance being integral one of the openings of the upper surface of the casing;

a speaker positionable within the cavity along the upper surface of the casing, the speaker having sound exiting another of the openings of the upper surface of the casing;

the rear end of the frame having positioned thereon a box-like storage unit, the storage unit having a bottom wall integral a rear section of the upper area of the base of the frame, a rear wall, a front wall with a short horizontal projection in a plane above the bottom wall and a pair of opposed side walls, the front wall, the rear wall and the pair of opposed side walls of the storage unit having an upper edge that forms a generally rectangular opening in a plane parallel the bottom wall, the rear wall having a recessed top portion, the side walls each having a side opening spaced from the front and adjacent the upper edge;

a generally rectangular lid having a rear edge and a front edge with a flap extending therefrom, the flap having a handle centrally positioned thereon, the rear edge of the lid being hingeablly coupled to the horizontal projection of the front wall of the storage unit, the lid capable of being positioned over the rectangular opening of the storage unit to form a flush upper surface;

a pair of tail lights being positioned on the rear wall of the storage unit, each tail light projecting exterior the rear wall and spaced apart;

three wide wheels forming a front wheel and two rear wheels, the front wheel being positionable between the front fork of the frame, the two rear wheels having an axial therebetween, the axial having a length for positioning through the spaced apart brackets of the frame, the three wide wheels support the frame above a recipient surface;

a seat having a back, a lower cushion and a pair of side arm rest, the seat being positionable on the base of the frame, the back leaning against the front wall of the storage unit, the lower cushion resting on the upper area of the base adjacent the rear section of the base, each side arm rest having a bottom panel attached to the base and an interior side next to the lower cushion and the back, the seat having seat belts for securing an infant therein; and a rigid U-shaped handle having a pair of in turned ends, each end capable of being positioned within one of the side openings of the side wall of the storage unit, the handle being capable of having an exterior force exert a forward motion thereon to move a stroller formed by the frame.

2. A motorcycle stroller comprising:

a trike frame having a front end, a rear end and a base therebetween, the base having a lower area with a pair of spaced apart brackets spaced from the rear end, the front end having a housing attached thereto and seated on a front section of the base, the housing having a front panel and seated thereon a casing, the casing having a front portion, an upper surface and a cavity therein, the front portion of the casing having attached thereto a throat with a front fork extending downwardly therefrom;

a handlebar being attached to the throat at a side opposite the front fork, the handlebar having a left handle and a right handle with each handle having a cover;

the rear end of the frame having positioned thereon a storage unit, the storage unit having a bottom wall integral a rear section of the base of the frame, a rear wall, a front wall with a short horizontal projection in a plane above the bottom wall and a pair of opposed side walls and an opening along an upper edge, the side walls each having a side opening spaced from the front and adjacent the upper edge;

a lid having a rear edge and a front edge, the rear edge of the lid being hingeablly coupled to the horizontal projection of the front wall of the storage unit, the lid capable of being positioned over the opening of the storage unit to form a flush upper surface;

three wide wheels forming a front wheel and two rear wheels, the front wheel being positionable between the front fork of the frame, the two rear wheels having an axial therebetween for positioning through the spaced apart brackets of the frame;

a seat having a back, a lower cushion and a pair of side arm rest, the seat being positionable on the base of the frame, the seat having seat belts for securing an infant therein; and a rigid U-shaped handle for pushing a stroller formed by the frame and having a pair of ends capable of being positioned within one of the side openings of the side wall of the storage unit.

3. The motorcycle stroller as set forth in claim 2 wherein the frame further having a front fender positionable over the front wheel and a pair of rear fenders, one of each of the rear fenders being positionable over a respective rear wheel.

4. The motorcycle stroller as set forth in claim 2 wherein the housing being generally rectangular having a rear panel and an interior area formed between the rear panel and the front panel when the casing being seated thereon.

5. The motorcycle stroller as set forth in claim 2 wherein the upper surface of the casing having a pair of openings spaced apart.

6. The motorcycle stroller as set forth in claim 2 wherein the cover of the handlebar having a break lever attachment integral thereto and the right handle of the handlebar having a throttle with a light switch and a sound switch adjacent the cover.

7. The motorcycle stroller as set forth in claim 2 wherein the casing having contained therein a mini-computer and a battery casing positioned along the upper surface of the casing with, and a speaker positioned along the upper surface of the casing.

8. The motorcycle stroller as set forth in claim 2 wherein the rear wall having a recessed top portion.

9. The motorcycle stroller as set forth in claim 8 wherein the lid having a flap extending from the front edge and the flap capable of being positioned over the recessed top portion of the rear forming a flush exterior surface with the rear wall.

10. The motorcycle stroller as set forth in claim 2 wherein the rear wall further having a pair of tail lights and a license plate with a plate light thereabove, the pair of tail lights being space apart along a common horizontal axis and a distance above the base, each of the tail lights being adjacent one of the side walls of the storage unit, the license plate being centrally positioned and adjacent the rear end of the frame.

11. The motorcycle stroller as set forth in claim 2 wherein the seat being positioned against the storage unit with the back of the seat leaning against the front wall of the storage unit and the seat being spaced from the housing and casing forming leg room for the infant above the base.

12. The motorcycle stroller as set forth in claim 2 wherein the front fork having an arc portion with a front light projecting therefrom in a direction away from the casing.

* * * * *